United States Patent [19]

Březina

[11] 4,417,377
[45] Nov. 29, 1983

[54] TOOL PROVIDING FOR THE AUTOMATIC EXCHANGE OF DIFFERENT WORKING FIXTURES

[75] Inventor: Josef Březina, Rokycany, Czechoslovakia

[73] Assignee: SKODA, Pilsen, Czechoslovakia

[21] Appl. No.: 243,585

[22] Filed: Mar. 13, 1981

[30] Foreign Application Priority Data

Mar. 13, 1980 [CS] Czechoslovakia ............... 1731-80
Mar. 13, 1980 [CS] Czechoslovakia ............... 1732-80
Mar. 13, 1980 [CS] Czechoslovakia ............... 1733-80

[51] Int. Cl.$^3$ ............................................. B23Q 3/157
[52] U.S. Cl. ........................................ 29/26 A; 29/568; 279/99; 408/239 R; 409/234
[58] Field of Search ............... 29/26 A, 56 B; 408/3, 408/35, 239, 239 A; 279/8, 99; 409/232, 234

[56] References Cited

U.S. PATENT DOCUMENTS

| | | | |
|---|---|---|---|
| 2,917,975 | 12/1959 | Webster | 409/234 X |
| 3,028,770 | 4/1962 | Pittwood | 29/26 A X |
| 3,139,800 | 7/1964 | Clarkson et al. | 409/234 X |
| 3,973,863 | 8/1976 | Smith | 29/568 X |

*Primary Examiner*—Z. R. Bilinsky

[57] ABSTRACT

Tool with automatic exchange of different working fixtures on a main holder of a machine tool, particularly adapted for digitally controlled coordinate machine tools, where the exchange, selection, and clamping of a required working fixture, stored in a storage container of working fixtures, proceeds automatically according to a prior determined program without manual attention by an attendant.

12 Claims, 11 Drawing Figures

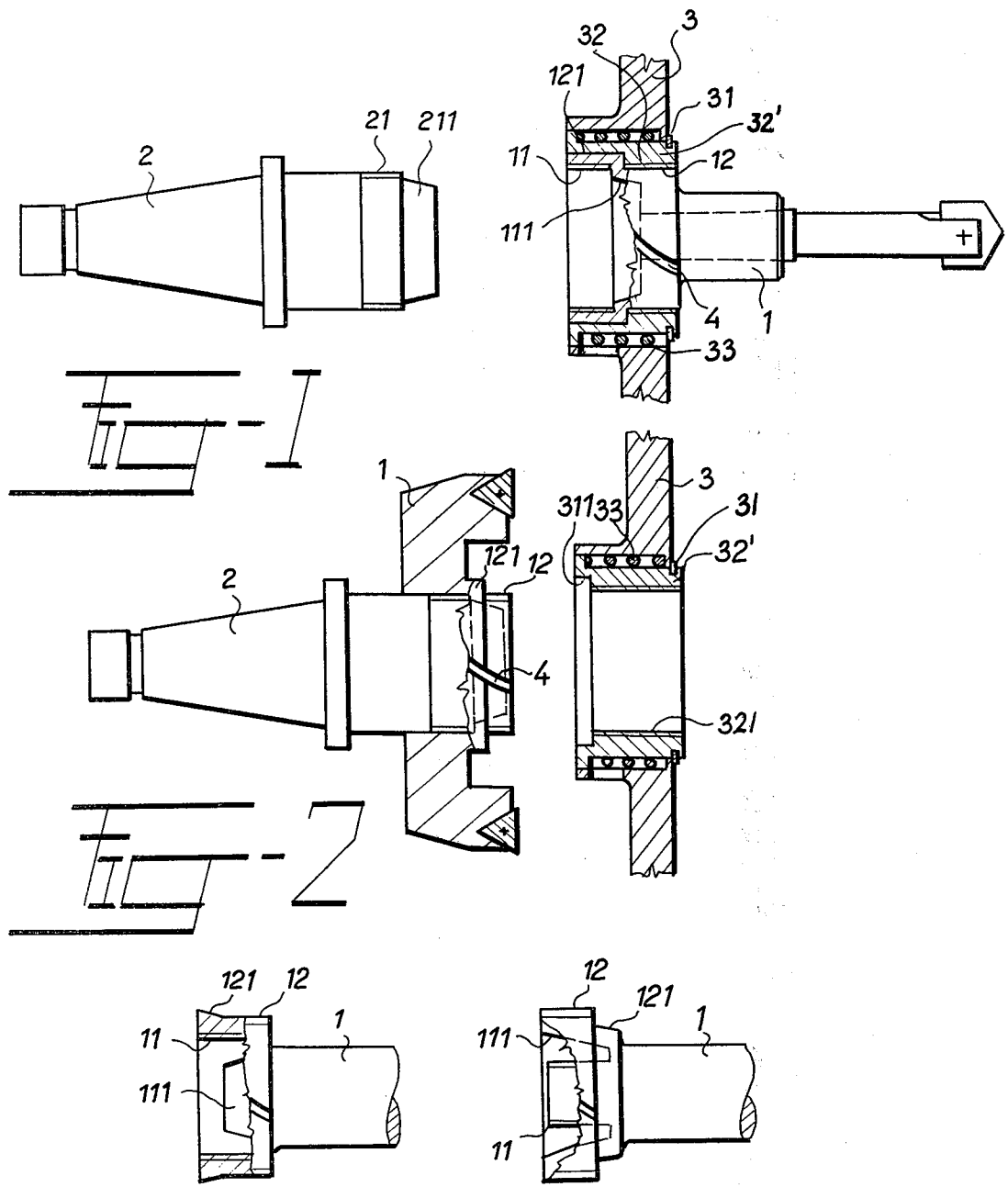

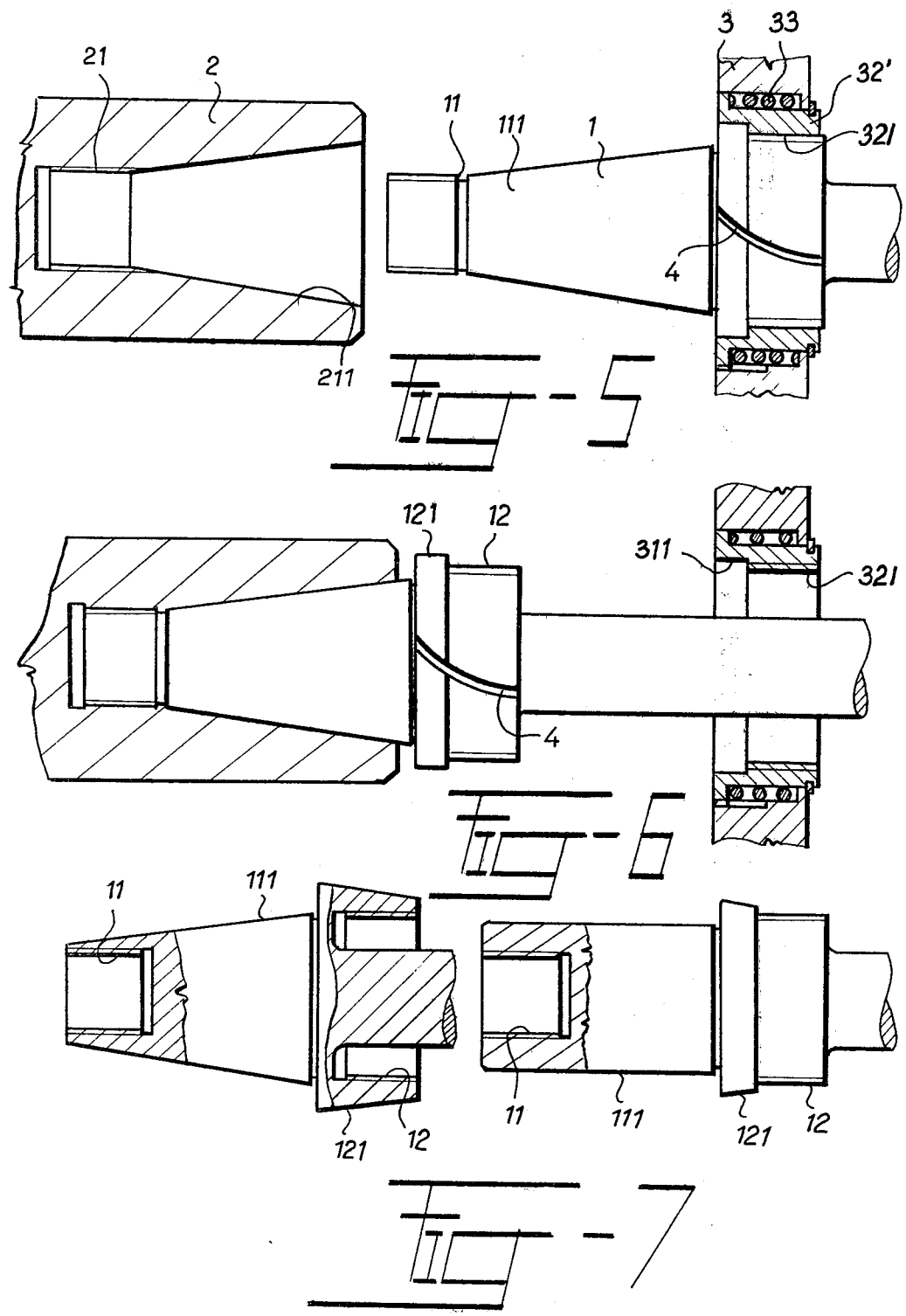

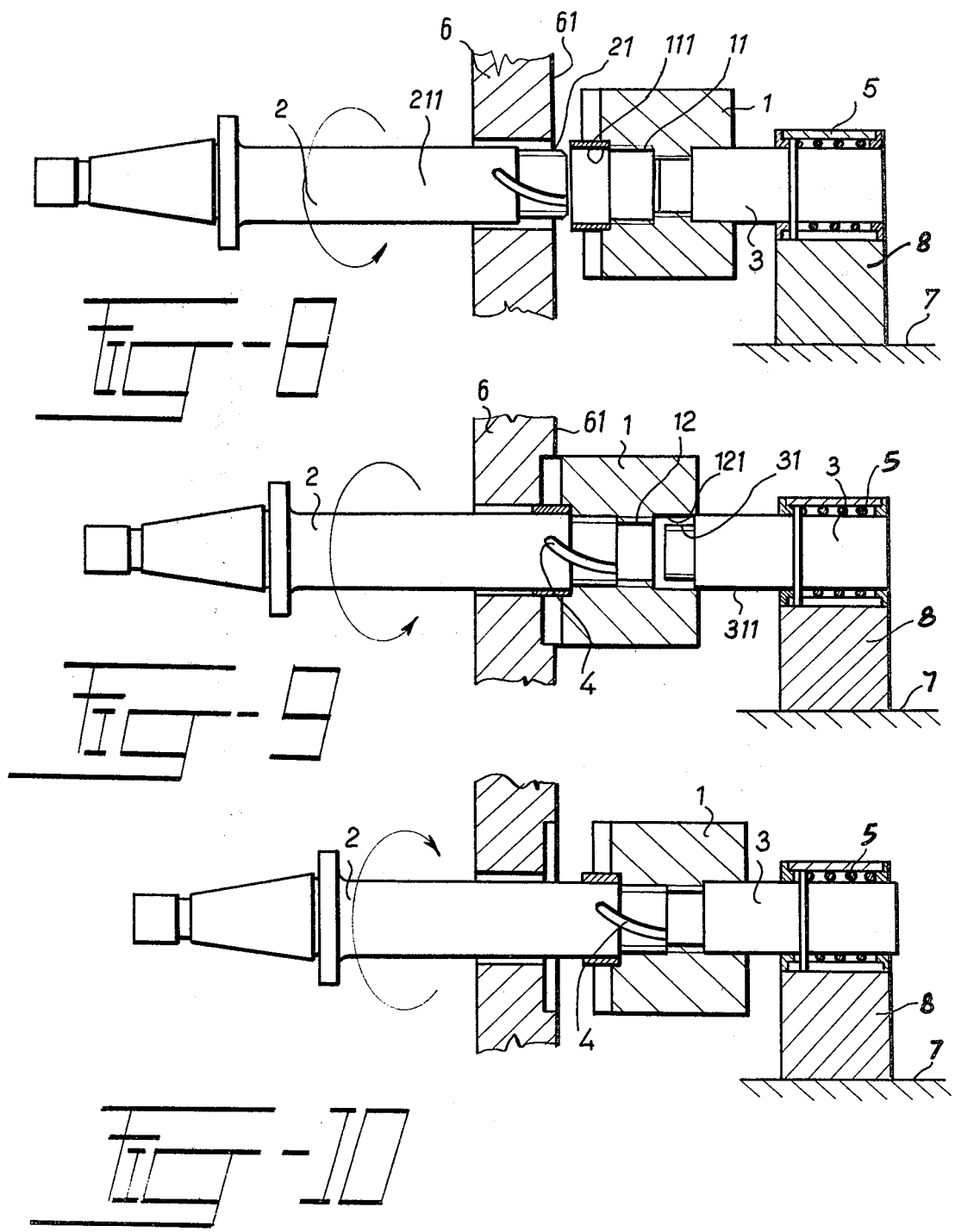

TOOL PROVIDING FOR THE AUTOMATIC EXCHANGE OF DIFFERENT WORKING FIXTURES

BACKGROUND OF THE INVENTION

The invention relates to a tool providing for the automatic exchange of different working fixtures, such tool being adapted particularly for digitally controlled coordinate machine tools.

Previously known systems for the automatic exchange of tools of digitally controlled machine tools reproduce the human handling when changing tools with conventional machine tools. The selection of tools from a program controlled storage container, their removal from the container, their adjustment to a suitably oriented spindle, and their clamping on the spindle of the machine tool are accomplished by means of a number of systems, conveying manipulators, and mechanical hands. All previously known automatic systems for the exchange of tools are controlled by many elements and by many functions designed solely for the exchange of tools. The complicated systems of evaluation of digital informations obtained from working circuits, of auxiliary functions and the acting elements taking part in existing systems causes the automatic exchange of tools to be the most frequent cause of failures of digitally controlled machine tools. The device used in prior systems for clamping tool shafts on the spindle does not allow any connection of additional means, for instance a supply of cooling medium or lubricating medium for the tools and the workpieces. Each tool is provided with a main holder or shaft, with the consequence that individual tools cannot be used on a machine tool with a different clamping spindle.

Previously known tools providing for the exchange of different tool fixtures are arranged so that the connection between the main holder and the tool fixture is accomplished by different bayonet fixtures, or by screw and thread connections. These tools have as their main drawback the fact that the exchange of a tool fixture on a main holder is performed manually. No previously known tool composed of a main holder and a tool fixture, nor any known system of tool fixtures for quick exchange performs the exchange of the tool fixture automatically, without human interference. Such human interference is particularly inonvenient with machines operating in an automatic cycle, since there is the necessity of presence of an attendant of the machine in the case of the manual exchange of tools, and the digitally controlled machine is unable to operate without human presence.

SUMMARY OF THE INVENTION

It is an object of this invention to provide a method and an arrangement enabling the automatic exchange of different tool fixtures particularly with digitally controlled coordinate machine tools. According to this invention, the tool fixture is provided with an external or internal thread for clamping, and concentrically therewith a side-tracking thread of a hand opposite that of the clamping thread. A clamping thread is furthermore provided on a main holder fixed on the spindle of the machine tool opposite to the clamping thread on the tool fixture. A side-tracking thread for tool fixtures is provided in a storage container for the tool fixture opposite to the side-tracking thread of the tool fixture. It is advantageous for accuracy and stiffness of the connection to provide cylindrical or conical centering surfaces on the tool fixture, on the main holder and on the storage container. It is furthermore advantageous if an axially cushioned non-rotatable sleeve with a side-tracking thread is provided on the storage container for the tool fixtures.

By abandoning the anthropomorphic conception of the automatic exchange of tools with digitally controlled machine tools, the present invention achieves with a surprising result the coincidence of the spindle of digitally controlled machine tools. The tool according to this invention automatically exchanges in a simple way different tool fixtures on a main holder which is fixed to the spindle of a machine tool. The main holder may be represented directly by the spindle of the machine tool. For the selection, exchange, and clamping of tool fixtures no attendant of the machine tool is required. The exchange is accomplished without the performance of auxiliary working movements, and is solely controlled by programmed movements of the spindle and by the programmed direction of rotation of the spindle of the machine tool. The elements for information for the exchange of tool fixtures are of the same character as the information elements for working. In consequence thereof, actually used systems controlling the automatic exchange of tools are eliminated.

The invention eliminates all acting elements and manipulators performing the actually used automatic change of tools, thus achieving a substantial simplicity and reliability. The thread connection and the conical or cylindrical centering surfaces secure an accurate and stiff fixing of the tool fixture on the main holder capable of transmitting all cutting forces. The internal space of the main holder, also possibly of the spindle, remains free for other mechanisms and devices. The tool enables the fixing of tool fixtures for a substantial range of diameters on a single size or type of the main holder, and it is possible to fix thereon quickly and accurately a large number of tool types, and if needed, also of prolongation or reduction elements. The system of connection by thread connection and an accurate centering cone or bolt enable, by means of universal reductions with different arrangements of clamping of tools of individual manufacturers, an exchangeability and possibility to complete subsequently a tool by means of a number of thread connections of different size.

By the exchange of the main holder, the whole systems of tool fixtures according to this invention can be applied with all systems of cavities of spindles of machine tools. The invention can be also applied for existing tools as it is not necessary to change the dimensions of cavities of spindles and of tool shafts. The thread extension can be fixed on exisitng conventional tool shafts. The maximum diameter of tools, particularly of milling cutters, is not limited by the diameter of side-tracking threads. With working centers, where the maximum length of the tool is limited, it is possible by the application of the invention automatically to prolong the length of the tool if a main holder is situated in the storage container. A simplification of the whole clamping system is achieved if the main holder is represented by the spindle of the machine tool. The cooling liquid may be supplied through the main holder or directly through a bore in the spindle. Sides of openings remote from the spindle of the machine tool can be worked by means of the tool with high cutting parameters, even in cases of a high ratio between the diameter of the remote worked side of the opening. The working fixture and the storage container are, in these cases, situated in front of the remote side of the workpiece.

The invention changes existing categories of digitally controlled machine tools, as it is possible by application of this invention to utilize each digitally controlled coordinate machine tool as a working center, characterized by the automatic exchange of tools

DESCRIPTIONS OF DRAWINGS

An examplary embodiment of a tool according to this invention is shown in the attached drawings, wherein:

FIG. 1 is an exploded view, partly in elevation and partly in section of a first embodiment of a tool fixture with a tool of a smaller diameter than the diameter of the side-tracking thread in the side-tracking position in the storage container prior to fixture exchange on a main holder;

FIG. 2 is a similar view of a second embodiment, with a tool fixture with a tool of larger diameter than the diameter of the side-tracking thread;

FIGS. 3a and 3b are views in elevation with parts in section of third and fourth embodiments, respectively, of thread shafts of working fixtures;

FIGS. 5, 6 and 7 show an elevation with parts in section a sixth embodiment of the tool, the figures showing the parts in various stages of assembly; and FIGS. 8, 9 and 10 show a seventh embodiment of a tool for working the side of a workpiece remote from the spindle of the machine tool, the views showing the parts in various stages of assembly and disassembly.

DESCRIPTION OF PREFERRED EMBODIMENTS

Figure 4:
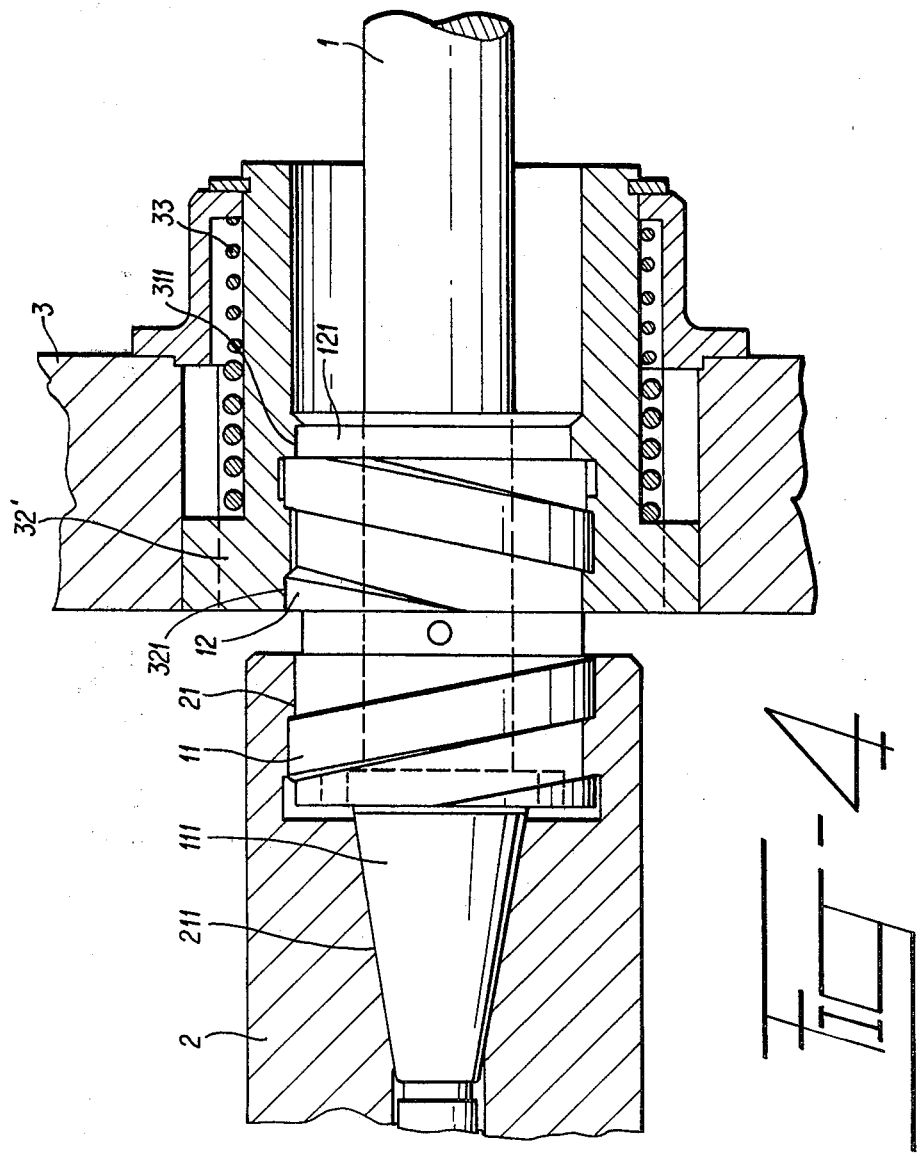
FIG. 4 shows in sectional elevation a fifth embodiment using a conventional tool on which a thread extension is fixed, and in which the spindle of the machine tool forms the main holder.

In the various figures, the same or similar parts are designated by the same reference characters.

Turning first to FIGS. 1 to 3b, incl., the various tools there shown each with automatic exchange of different tool fixtures comprises a tool fixture 1 situated in the side-tracking position in a storage container 3. The tool fixture 1 is provided with an internal clamping thread 11 and with an external side-tracking thread 12 concentrically of and with a hand opposite that of of the clamping thread 11. A main holder 2 fixed to the spindle of the machine tool is provided with an external clamping thread 21 which is shown coaxial with the clamping thread 11 of the tool fixture and adapted to mate therewith when such parts are advanced toward each other and are turned in the appropriate direction relative to each other. The storage container 3 of tool fixtures 1 is provided with an internal side-tracking thread 32 opposite to the side-tracking thread 12 of the tool fixture 1 and adapted to mate therewith. The threads 11, 12, 21, 32 may be replaced by non-self-locking mating helical hands and grooves, as shown in FIG. 4.

The tool fixture 1 is centered by conical or cylindrical centering surfaces 111, 121, 211, and 311 (FIG. 2). It is advantageous if a radially secured sleeve 32 with a side-tracking thread 32 is provided in the storage container 3 for tool fixtures 1, which sleeve 32' is cushioned by a coil compression spring 33. A spring ring 31' fitted in an annular groove in sleeve 32' prevents the escape of sleeve 32' from storage container 3.

In order to remove possible dirt between the threads 12, 32 and the centering surfaces 121, 311 grooves 4 are provided on the side-tracking thread 12 and the centering surface 121. The tool can be simplified if the main holder 2 is represented directly by the spindle of the machine tool. The invention can be also used with conventional tool systems if the clamping thread 11 and the side-tracking thread 12 are provided on a sleeve which is fixed on a conventional tool shaft (FIG. 4). The side 61 of the workpiece 6 distant from the spindle of the machine tool can be also worked by a tool according to this invention if the tool fixture 1 and the storage container 3 are situated in front of the remote side of the workpiece 6 as shown in the embodiment of FIGS. 8, 9, and 10. As shown in FIGS. 8, 9, and 10, the storage container 3 is supported in a member 8 resting upon a fixed support 7. Container 3 is yieldably retained in its left-hand terminal position by a coil compression spring 5. The tool fixture can be also formed by the tool or can be represented by a sleeve, and possibly also by an extension or reduction for fixing a conventional tool.

The storage container 3 of working fixtures 1 can be also arranged so as not to restrict the working plane of the machine tool. The tool fixture 1 can, after being screwed in the storage container 3 or in a main holder 2, control a switch, which influences the further continuation of the program, this arrangement is not shown in the attached drawings, where also the blowing of the threads and the centering surfaces, and a possible protection of these parts by a compressible slidable cover are not shown.

The apparatus according to the invention operates as follows:

The tool according to this invention operates so that the main holder 2 with the clamping thread 21 fixed on the spindle of the machine tool or directly on its spindle, particularly with digitally controlled coordinate machine tools, is in the automatic cycle adjusted opposite to coordinates of a working fixture 1 situated in the storage container 3. In the course of turning of the main holder 2 in the working direction of rotation the clamping threads 11, 21 are screwed together. With a continuation of the same direction of turning the subsequent unscrewing of the side-tracking threads 12, 31 is acomplished, thereby separating the tool fixture 1 from the storage container 3. The working fixture 1 performs the working operation in the same direction, i.e. in the working direction of rotation of turning in the automatic cycle; after finishing the working operation the main holder 2 with the tool fixture 1 are adjusted in the automatic cycle opposite to coordinates of the side-tracking thread 32 of the storage container 3, and with a reversed direction of turning the main holder 2 the transfer of the tool fixture 1 to the storage container 3 is achieved in an analogical process.

The exchange of individual tool fixtures 1 can be programmed in the control program algorythmically, and the proper exchange accomplished can be so far as it is enabled by the type of the tool fixture 1, by axial compression of the cushioned sleeve 32' of the storage container 3 for the length of a turn, and be subsequently accomplished the exchange of the tool fixture solely by turning in the respective direction.

The tool according to this invention can be advantageously applied, in addition to program controlled machine tools, also, for instance, in conventional boring and milling machines where an exchange of tools is difficult due to their large weight. The tool can be also advantageously applied with working centers for tools which due to their large dimensions cannot be situated in a container of tools of working centers, or if the workpiece and tool have to be cooled in the course of working and the cooling medium cannot be supplied through the spindle of the machine tool.

Although the invention is illustrated and described with reference to a plurality of embodiments thereof, it is to be expressly understood that it is in no way limited to the disclosure of such preferred embodiments, but is capable of numerous modifications within the scope of the appended claims.

I claim:

1. Apparatus for the automatic exchange of different tool fixtures particularly adapted for digitally controlled coordinate machine tools having a driven spindle, comprising a number of tool fixtures, a main holder forming a unit with the spindle of a machine tool, and a storage container for tool fixtures, each tool fixture being provided with a clamping thread and concentrically therewith a side-tracking thread of opposite hand, the main holder being provided with a clamping thread adapted to be positioned in axial alignment with the clamping thread of the tool fixture, and the storage container being provided with a side-tracking thread in axial alignment with the side-tracking thread of the tool fixture, the clamping thread on the main holder being of the same hand as the clamping thread on the tool fixture, and the side-tracking thread on the tool fixture being of the same hand as the side-tracking thread on the storage container.

2. Apparatus as claimed in claim 1, wherein the tool fixture, the main holder, and the storage container are provided with centering surfaces.

3. Apparatus as claimed in claim 1, wherein the container of tool fixtures comprises a radially secured sleeve with the side-tracking thread, the sleeve being axially cushioned by a spring in the storage container of tool fixtures.

4. Apparatus as claimed in claim 1, wherein grooves are provided on the threads of the main holder, of the tool fixture, and of the storage container of tool fixtures.

5. Apparatus as claimed in claim 2, wherein grooves are provided on the centering surfaces.

6. Apparatus as claimed in claim 1, wherein the main holder is the spindle of the machine tool.

7. Apparatus as claimed in claim 1, comprising a sleeve fixed on the spindle of the machine tool, said sleeve being provided with a clamping and with a side-tracking thread.

8. Apparatus as claimed in claim 1 for the working of sides of a workpiece distant from the spindle of the machine tool, wherein the tool fixture and the storage container of tool fixtures are situated in front of the remote side of the workpiece.

9. Apparatus as claimed in claim 1, wherein the tool fixture is formed by the tool.

10. Apparatus as claimed in claim 1, wherein the tool fixture is formed by a sleeve supporting the working tool.

11. Apparatus as claimed in claim 1, wherein the tool fixture is formed by an extension supporting the working tool.

12. Apparatus as claimed in claim 1, wherein the tool fixture is formed by a reduction supporting the working tool.

* * * * *